US012747331B2

(12) United States Patent
Denifl et al.

(10) Patent No.: US 12,747,331 B2
(45) Date of Patent: Sep. 29, 2026

(54) COMBINED WASHING/DELAMINATION PROCESS FOR MULTILAYER FILM-CONTAINING RECYCLING STREAMS

(71) Applicant: Borealis AG, Vienna (AT)

(72) Inventors: Peter Denifl, Linz (AT); Kilian Piettre, Linz (AT); Bernadette Duscher, Linz (AT); Auli Nummila-Pakarinen, Kullo (FI); Peter Niedersüss, Linz (AT); Anthony Berthelier, Courbevoie (FR); Andreas Nagl, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/293,458

(22) PCT Filed: Aug. 2, 2022

(86) PCT No.: PCT/EP2022/071684
§ 371 (c)(1),
(2) Date: Jan. 30, 2024

(87) PCT Pub. No.: WO2023/012156
PCT Pub. Date: Feb. 9, 2023

(65) Prior Publication Data

US 2025/0115729 A1 Apr. 10, 2025

(30) Foreign Application Priority Data

Aug. 4, 2021 (EP) .................................... 21189666

(51) Int. Cl.

| | |
|---|---|
| ***C08J 11/06*** | (2006.01) |
| ***B29B 17/02*** | (2006.01) |
| ***B29B 17/04*** | (2006.01) |
| ***B29K 23/00*** | (2006.01) |
| ***B29L 9/00*** | (2006.01) |

(52) U.S. Cl.
CPC ............... *C08J 11/06* (2013.01); *B29B 17/02* (2013.01); *B29B 17/0412* (2013.01); *B29B 2017/0289* (2013.01); *B29B 2017/0296* (2013.01); *B29K 2023/06* (2013.01); *B29K 2023/12* (2013.01); *B29L 2009/003* (2013.01); *C08J 2323/06* (2013.01); *C08J 2323/12* (2013.01)

(58) Field of Classification Search
CPC .... C08J 11/06; C08J 2323/06; C08J 2323/12; B29B 17/02; B29B 17/0412; B29B 2017/0289; B29B 2017/0296
USPC .................................. 209/3; 241/24.1, 24.18
See application file for complete search history.

(56) References Cited

U.S. PATENT DOCUMENTS

| | | | | |
|---|---|---|---|---|
| 7,497,335 | B2 * | 3/2009 | Bork | B29B 17/04 209/172.5 |
| 2014/0231557 | A1 | 8/2014 | Riise et al. | |
| 2017/0291402 | A1 * | 10/2017 | El Cheikh Ali | B32B 27/18 |
| 2019/0351663 | A1 | 11/2019 | Lovis et al. | |
| 2021/0187790 | A1 | 6/2021 | Ohara et al. | |

FOREIGN PATENT DOCUMENTS

| | | | |
|---|---|---|---|
| DE | 10102554 | A1 | 7/2002 |
| EP | 1683829 | A1 | 7/2006 |
| JP | H04204354 | A | 7/1992 |
| JP | H0629100 | A | 2/1994 |
| KR | 100361735 | B1 | 11/2002 |
| WO | 2011077450 | A2 | 6/2011 |
| WO | 2011082802 | A1 | 7/2011 |
| WO | 2020059516 | A1 | 3/2020 |

OTHER PUBLICATIONS

International Search Report and Written Opinion for PCT/EP2022/071684 mailed Dec. 6, 2022, 14 pages.
European Search Report for Application No. 21189666.7, dated Feb. 11, 2022, 10 pages.
Office Action with English translation for Japanese Patent Application No. 2024-506156 dated Feb. 7, 2025, 5 pages.
Office Action for United Arab Emirates Application No. P6000239/2024 issued on May 22, 2026, 8 pages.

* cited by examiner

*Primary Examiner* — Molly K Devine
(74) *Attorney, Agent, or Firm* — Lowenstein Sandler LLP

(57) ABSTRACT

A method for achieving the simultaneous washing/delamination of multilayer films via treatment with an alkaline aqueous solution during a mechanical recycling process, thereby improving the yield and/or purity of a desired polyolefin.

18 Claims, No Drawings

COMBINED WASHING/DELAMINATION PROCESS FOR MULTILAYER FILM-CONTAINING RECYCLING STREAMS

CROSS-REFERENCE TO RELATED APPLICATION(S)

The present application is a national stage entry under 35 U.S.C. § 371 of International Application No. PCT/EP2022/071684, filed on Aug. 2, 2022, which claims priority to European Patent Application No. 21189666.7, filed on Aug. 4, 2021. The contents of these applications are hereby incorporated by reference in their entirety.

FIELD OF THE INVENTION

The present invention relates to a combined washing/delamination process for processing polyolefin mixed recycling streams, as well as a use of an alkaline aqueous solution in such a combined washing/delamination step, as well as the use of an alkaline aqueous solution in the broader context of a recycling process.

BACKGROUND TO THE INVENTION

During the last decade, concern about plastics and the environmental sustainability of their use in current quantities has grown. This has led to new legislation on disposal, collection and recycling of polyolefins. There have additionally been efforts in a number of countries to increase the percentage of plastic materials being recycled instead of being sent to landfill.

In Europe, plastic waste accounts for approximately 27 million tons of waste a year; of this amount in 2016, 7.4 million tons were disposed of in landfill, 11.27 million tons were burnt (in order to produce energy) and around 8.5 million tons were recycled. Polypropylene based materials are a particular problem as these materials are extensively used in packaging. Taking into account the huge amount of waste collected compared to the amount of waste recycled back into the stream (amounting to only about 30%), there is still a great potential for intelligent reuse of plastic waste streams and for mechanical recycling of plastic wastes.

Taking the automobile industry as an example: in Europe the end of life (ELV) directive from the EU states, that 85%/95% of materials from vehicles should be recyclable or recoverable. The present rate of recycling of automobile components is significantly below this target. On average vehicles consist of 9 wt.-% plastics, out of this 9 wt.-% only 3 wt.-% is currently recycled. Therefore, there is still a need to be met if targets for recycling plastics in the automobile industry are to be achieved. This invention particularly focuses on mechanically recycled waste streams as opposed to “energetic recycling” where polyolefins are burnt and used for energy. However, due to cost reasons, poor mechanical properties and inferior processing properties waste streams containing cross-linked polyolefins are often used for energy recovery (e.g. incineration in a district heating plant or for heat generation in the cement industry) and are less often recycled into new products.

One major trend in the field of polyolefins is the use of recycled materials that are derived from a wide variety of sources. Durable goods streams such as those derived from waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or raman fluorescence.

The better the quality, i.e. the higher the purity, of the recycled polyolefin the more expensive the material is. Moreover, recycled polyolefin materials are often cross-contaminated with non-polyolefin materials, such as polyethylene terephthalate, polyamide, polystyrene or non-polymeric substances like wood, paper, glass or aluminium. Furthermore, polyolefin films are often multilayer structures, which combine the barrier properties and the sealing properties of the layers. These multilayer structures can, in addition to the predominant polyolefin, contain other polyolefins and even non-polyolefinic materials.

In addition, recycled polyolefin rich materials often have properties much worse than those of the virgin materials, unless the amount of recycled polyolefin added to the final compound is extremely low.

Packaging materials are often formed from multilayer laminates. Such laminates are difficult to recycle, since they often contain multiple polymer layers and/or other non-polymeric materials that would contaminate the polymeric output of the recycling process, which is preferably a single polyolefin (e.g. polypropylene or polyethylene).

The removal of such films from polyolefin mixed recycling streams is the simplest way to remove these sources of contamination; however, this option is wasteful, with potentially useful polyolefin not being recovered.

Many delamination procedures are known in the art, often employing organic, acid, or highly engineered delaminant solutions. Whilst these procedures can help to recover more of the desired polyolefin from a particular polyolefin recycling process, incorporation of extra steps into the process is undesirable from the standpoint of process economy.

As such, a method wherein a delamination step can be combined with existing steps, such as washing or deodorising, using cheap, readily available delaminant solutions would be incredibly useful for minimising waste in recycling processes in an economical manner.

The present invention is based on the finding that a simple washing/delamination step involving simple alkaline aqueous solutions can address these goals.

SUMMARY OF THE INVENTION

In a first aspect, the present invention is directed to a process for treating a polyolefin mixed recycling stream (A1), comprising, in the given order, the steps of:

a1) providing a polyolefin mixed recycling stream (A1), wherein the polyolefin mixed recycling stream (A1) comprises multilayer films (F) and optionally monolayer films of a desired polyolefin (PO), wherein the multilayer films (F) comprise the following layers:
- (a) an outer layer consisting of the desired polyolefin (PO);
- (b) a metal layer in contact with the outer layer (a); and
- (c) optionally one or more further layers wherein at least one of the one or more further layers is in contact with the metal layer (b), wherein the one or more further layers may contain the desired polyolefin (PO), polyolefin other than the desired polyolefin, or non-polyolefin material;

b1) selecting those pieces present in the polyolefin mixed recycling stream (A1) that are either monolayer film pieces of the desired polyolefin (PO), if present, or pieces of multilayer films (F) as defined in step a1), preferably by near-IR spectroscopic analysis, and separating and collecting these pieces to form a recycling stream (B1) enriched in the desired polyolefin (PO);

c1) milling, shredding or grinding the recycling stream (B1) enriched in the desired polyolefin (PO) to convert any pieces that are not in flaked form into flakes with a flake surface area in the range from 50 to 2500 mm$^2$, thereby obtaining a recycling stream (B1) enriched in the desired polyolefin (PO) in flaked form;

d1) treating the recycling stream (B1) enriched in the desired polyolefin (PO) in flaked form with an alkaline aqueous solution, thereby obtaining a treated recycling stream (C) dispersed in the alkaline aqueous solution;

e1) removing the alkaline aqueous solution, thereby obtaining the treated recycling stream (C);

f1) rinsing the treated recycling stream (C) with solvent, preferably water or an aqueous solution, thereby removing all residue of the alkaline aqueous solution to obtain a rinsed recycling stream (D);

g1) selecting those flakes present in the rinsed recycling stream (D) that contain any material other than the desired polyolefin (PO), preferably by density in solution or near-IR spectroscopic analysis, and removing these flakes from the treated recycling stream to leave a remaining recycling stream (E) of the desired polyolefin (PO); and h1) optionally extruding and pelletizing the recycling stream (E) of the desired polyolefin (PO) to form pellets (P) of the desired polyolefin (PO), wherein step c1) can be omitted in the case that the pieces of the recycling stream (B1) enriched in the desired polyolefin (PO) are already in flaked form with a flake surface area in the range from 50 to 2500 mm$^2$.

In a second aspect, the present invention is directed to a process for treating a recycling stream (B2) enriched in a desired polyolefin (PO), comprising, in the given order, the steps of:

a2) providing a recycling stream (B2) enriched in the desired polyolefin (PO), wherein the recycling stream (B2) comprises multilayer films (F) and optionally monolayer films of a desired polyolefin (PO), wherein the multilayer films (F) comprise the following layers:

(a) an outer layer consisting of the desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein the recycling stream (B2) enriched in the desired polyolefin (PO) is provided in flaked form, and wherein the recycling stream (B2) enriched in the desired polyolefin (PO) is obtainable by a process comprising the steps, in the given order, of selecting those pieces present in a precursor polyolefin mixed recycling stream (A2) that are either monolayer film pieces of the desired polyolefin (PO), if present, or pieces of multilayer films (F) as defined above, preferably by near-IR spectroscopic analysis, and separating and collecting these pieces to form the recycling stream (B2) enriched in the desired polyolefin (PO);

b2) treating the recycling stream (B2) enriched in the desired polyolefin (PO) in flaked form with an alkaline aqueous solution, thereby obtaining a treated recycling stream (C) dispersed in the alkaline aqueous solution;

c2) removing the alkaline aqueous solution, thereby obtaining the treated recycling stream (C);

d2) rinsing the treated recycling stream (C) with solvent, preferably water or an aqueous solution, thereby removing all residue of the alkaline aqueous solution to obtain a rinsed recycling stream (D);

e2) selecting those flakes present in the rinsed recycling stream (D) that contain any material other than the desired polyolefin (PO), preferably by density in solution or near-IR spectroscopic analysis, and removing these flakes from the treated recycling stream to leave a remaining recycling stream (E) of the desired polyolefin (PO); and f2) optionally extruding and pelletizing the recycling stream (E) of the desired polyolefin (PO) to form pellets (P) of the desired polyolefin (PO).

In a third aspect, the present invention is directed to a process for treating a polyolefin mixed recycling stream (B3), comprising, in the given order, the steps of:

a3) providing a polyolefin mixed recycling stream (B3) that comprises at least 50 wt.-%, relative to the total weight of the polyolefin mixed recycling stream (B3), of multilayer films (F) comprising the following layers:

(a) an outer layer consisting of a polyolefin (PO);

(b) a metal layer in contact with the outer layer (a); and (c) optionally one or more further layers wherein at least one of the one or more further layers is in contact with the metal layer (b), wherein the one or more further layers may contain the polyolefin (PO) of the outer layer (a), polyolefin other than the polyolefin of the outer layer, or non-polyolefin material;

b3) milling, shredding or grinding the polyolefin mixed recycling stream (B3) to convert any pieces that are not in flaked form into flakes with a flake surface area in the range from 50 to 2500 mm$^2$, thereby obtaining a polyolefin mixed recycling stream (B3) in flaked form;

c3) treating the polyolefin mixed recycling stream (B3) in flaked form with an alkaline aqueous solution, thereby obtaining a treated recycling stream (C3) dispersed in the alkaline aqueous solution;

d3) removing the alkaline aqueous solution, thereby obtaining the treated recycling stream (C3), wherein step b3) can be omitted in the case that the pieces of the polyolefin mixed recycling stream (B3) are already in flaked form with a flake surface area in the range from 50 to 2500 mm$^2$.

In a further aspect, the present invention is directed to a use of an alkaline aqueous solution for achieving a combined wash/delamination of flaked multilayer films (F) that comprise the following layers:

(a) an outer layer consisting of a desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein delamination is achieved when the outer layer (a) that comprises the desired polyolefin (PO) is no longer in contact with the metal layer (b).

In a final aspect, the present invention is directed to a use of an alkaline aqueous solution for improving the yield of desired polyolefin (PO) in a process for obtaining a recycled stream (E) of desired polyolefin (PO) from a polyolefin mixed recycling stream that comprises multilayer films (F) comprising the following layers:

(a) an outer layer consisting of a desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein a recycling stream (B) enriched in the desired polyolefin (PO), consisting of multilayer flakes of multilayer films (F) as defined above and optionally monolayer film flakes of the desired polyolefin (PO), is treated with the alkaline aqueous solution in a combined washing/delamination step, and wherein the yield of the desired polyolefin (PO) is improved relative to an analogous process without a step of treating the recycling stream (B) with alkaline aqueous solution in a combined washing/delamination step.

Definitions

The person skilled in the art would be aware that pH values of greater than 14.0 and lower than 0.0 are theoretically possible; however, they would also be aware that the determination of such pH values is incredibly difficult using conventional pH probes. As such, in the context of this invention, aqueous solutions having an effective pH of greater than 14.0 are considered to have a pH of 14.0 and aqueous solutions having an effective pH of lower than 0.0 are considered to have a pH of 0.0.

In the context of the present invention, the term "rinse" is used to indicate the addition of a solvent, typically water, which is used to remove foreign material or remaining liquid from the surface of the polyolefin. This can be achieved in very short times, i.e. less than 5 minutes, often less than 1 minute, in contrast to "washing" steps that typically require a longer time, and agitation, to remove adherent foreign material from the surface of the polyolefin and potentially extract volatile organic compounds from the polyolefin.

Post-consumer waste refers to objects having completed at least a first use cycle (or life cycle), i.e. having already served their first purpose; while industrial waste refers to manufacturing scrap, which does not normally reach a consumer.

Recycling streams may contain both articles for recycling and fragments of articles for recycling, for example flakes. In the context of the present invention, the content of the recycling streams will be referred to as pieces, irrespective of whether these pieces are whole articles, fragments thereof, or flakes thereof. In certain embodiments, the pieces may be flakes, whereas in other embodiments pieces may be larger objects that may be converted into flakes at a later stage.

In the context of the present invention, a polyolefin mixed recycling stream may be any stream suitable for recycling, wherein polyolefin is present and the stream does not only contain a single polyolefin product, as would be the case, for example, for certain post-industrial waste recycling streams wherein the production waste of a single polyolefin grade, or a single polyolefin-containing article may be the only piece present in the stream. Generally speaking, all polyolefin-containing post-consumer waste recycling streams will be polyolefin mixed recycling streams, as will many polyolefin-containing post-industrial waste recycling streams.

Polyolefin films are typically made up of a thin layer or layers of polyolefin, meaning that one dimension of the films will be very small and the other two dimensions can be orders of magnitude greater. The same is true for flakes, which may be formed from films or from similarly thin shaped articles such as plastic bags. In the context of the present disclosure, the term "in flaked form", or "flakes" or "flaked" refers to the shape of the object, wherein, like films, one dimension of the flake is very small and the other two dimensions may be orders of magnitude greater. Any complicated articles with defined shapes, such as plastic bags, which have well defined outer and inner surfaces, would not be considered as either films or flakes in the context of the present invention, although these articles may be converted into flakes of any size by methods known to the person skilled in the art.

In the context of the present invention, the flake surface area is defined as the surface area of one of the faces of a flaked polyolefin. This surface area is approximately half of the total surface area of the flake, which has two such faces in addition to a very small amount of surface area coming from the edges of the flake. Flakes according to the present invention will typically have a flake surface area in the range from 50 to 2500 $mm^2$, more preferably in the range from 100 to 1600 $mm^2$, most preferably in the range from 150 to 900 $mm^2$.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of elements, this is also to be understood to disclose a group, which preferably consists only of these elements.

The phrase "polyolefin other than the desired polyolefin (PO)" or "polyolefin other than the polyolefin of the outer layer (a)" encompasses both a single polyolefin that is different from the cited polyolefin and multiple polyolefins that are different from the cited polyolefin.

Where an indefinite or definite article is used when referring to a singular noun, e.g. "a", "an" or "the", this includes a plural of that noun unless something else is specifically stated.

DETAILED DESCRIPTION

Process

In a first aspect, the process for treating a polyolefin mixed recycling stream (A1), comprises, in the given order, the steps of:

a1) providing a polyolefin mixed recycling stream (A1), wherein the polyolefin mixed recycling stream (A1) comprises multilayer films (F) and optionally monolayer films of a desired polyolefin (PO), wherein the multilayer films (F) comprise the following layers:

(a) an outer layer consisting of the desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material;

b1) selecting those pieces present in the polyolefin mixed recycling stream (A1) that are either monolayer film pieces of the desired polyolefin (PO), if present, or pieces of multilayer films (F) as defined in step a1), preferably by near-IR spectroscopic analysis, and separating and collecting these pieces to form a recycling stream (B1) enriched in the desired polyolefin (PO);

c1) milling, shredding or grinding the recycling stream (B1) enriched in the desired polyolefin (PO) to convert any pieces that are not in flaked form into flakes with a flake surface area in the range from 50 to 2500 $mm^2$, thereby obtaining a recycling stream (B1) enriched in the desired polyolefin (PO) in flaked form;

d1) treating the recycling stream (B1) enriched in the desired polyolefin (PO) in flaked form with an alkaline aqueous solution, thereby obtaining a treated recycling stream (C) dispersed in the alkaline aqueous solution;

e1) removing the alkaline aqueous solution, thereby obtaining the treated recycling stream (C);

f1) rinsing the treated recycling stream (C) with solvent, preferably water or an aqueous solution, thereby removing all residue of the alkaline aqueous solution to obtain a rinsed recycling stream (D);

g1) selecting those flakes present in the rinsed recycling stream (D) that contain any material other than the desired polyolefin (PO), preferably by density in solution or near-IR spectroscopic analysis, and removing these flakes from the treated recycling stream to leave a remaining recycling stream (E) of the desired polyolefin (PO); and h1) optionally extruding and pelletizing the recycling stream (E) of the desired polyolefin (PO) to form pellets (P) of the desired polyolefin (PO), wherein step c1) can be omitted in the case that the pieces of the recycling stream (B1) enriched in the desired polyolefin (PO) are already in flaked form with a flake surface area in the range from 50 to 2500 $mm^2$.

In an alternative aspect, the process for treating a recycling stream (B2) enriched in a desired polyolefin (PO), comprises, in the given order, the steps of:

a2) providing a recycling stream (B2) enriched in the desired polyolefin (PO), wherein the recycling stream (B2) comprises multilayer films (F) and optionally monolayer films of a desired polyolefin (PO), wherein the multilayer films (F) comprise the following layers:

(a) an outer layer consisting of the desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein the recycling stream (B2) enriched in the desired polyolefin (PO) is provided in flaked form, and wherein the recycling stream (B2) enriched in the desired polyolefin (PO) is obtainable by a process comprising the steps, in the given order, of selecting those pieces present in a precursor polyolefin mixed recycling stream (A2) that are either monolayer film pieces of the desired polyolefin (PO), if present, or pieces of multilayer films (F) as defined above, preferably by near-IR spectroscopic analysis, and separating and collecting these pieces to form the recycling stream (B2) enriched in the desired polyolefin (PO);

b2) treating the recycling stream (B2) enriched in the desired polyolefin (PO) in flaked form with an alkaline aqueous solution, thereby obtaining a treated recycling stream (C) dispersed in the alkaline aqueous solution;

c2) removing the alkaline aqueous solution, thereby obtaining the treated recycling stream (C);

d2) rinsing the treated recycling stream (C) with solvent, preferably water or an aqueous solution, thereby removing all residue of the alkaline aqueous solution to obtain a rinsed recycling stream (D);

e2) selecting those flakes present in the rinsed recycling stream (D) that contain any material other than the desired polyolefin (PO), preferably by density in solution or near-IR spectroscopic analysis, and removing these flakes from the treated recycling stream to leave a remaining recycling stream (E) of the desired polyolefin (PO); and f2) optionally extruding and pelletizing the recycling stream (E) of the desired polyolefin (PO) to form pellets (P) of the desired polyolefin (PO).

These two aspects differ only in the first steps a1), b1), c1) and a2). Steps d1) to h1) of the first aspect and steps b2) to f2) of the second aspect are, in the broadest sense, the same in the two embodiments.

The first aspect describes a process by which a polyolefin mixed recycling stream (A1) is enriched in desired polyolefin (PO)-containing pieces, prior to being treated according to the later steps of the process, whereas the second aspect describes a process wherein the polyolefin mixed recycling stream has already been enriched in desired polyolefin (PO) containing pieces prior to being subjected to the process of the invention. Whether the enrichment is carried out by the same person as the process of the invention or by a third party is irrelevant to the meaning of the second aspect.

Likewise, the requirement in step a2) that the recycling stream (B2) is provided in flaked form may be fulfilled, for example, by the sorting of a recycling stream followed by conversion into flakes, the conversion of a pre-sorted recycling stream into flakes, the sorting of a recycling stream that is already in flaked form, and the purchase of a pre-sorted recycling stream that is already in flaked form.

In one particular embodiment, step a2) comprises the individual steps, in the given order, of:

a2.1) providing a recycling stream (B2) enriched in the desired polyolefin (PO), wherein the recycling stream (B2) comprises multilayer films (F) and optionally monolayer films of a desired polyolefin (PO), wherein the multilayer films (F) comprise the following layers:

(a) an outer layer consisting of the desired polyolefin (PO);

(b) a metal layer in contact with the outer layer (a); and (c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein the recycling stream (B2) enriched in the desired polyolefin (PO) is obtainable by a process comprising the steps, in the given order, of selecting those pieces present in a precursor polyolefin mixed recycling stream (A2) that are either monolayer film pieces of the desired polyolefin (PO), if present, or pieces of multilayer films (F) as defined above, preferably by near-IR spectroscopic analysis, and separating and collecting these pieces to form the recycling stream (B2) enriched in the desired polyolefin (PO); and a2.2) milling, shredding or grinding the recycling stream (B2) enriched in the desired polyolefin (PO) to convert any pieces that are not in flaked form into flakes with a flake surface area in the range from 50 to 2500 $mm^2$, thereby obtaining a recycling stream (B2) enriched in the desired polyolefin (PO) in flaked form.

In another embodiment, step a2) may be achieved through the following steps, in the given order:

a2.i) providing a polyolefin mixed recycling stream (A2), wherein the polyolefin mixed recycling stream (A2) comprises multilayer films (F) and optionally monolayer films of a desired polyolefin (PO), wherein the multilayer films (F) comprise the following layers:
  (a) an outer layer consisting of the desired polyolefin (PO);
  (b) a metal layer in contact with the outer layer (a); and
  (c) optionally one or more further layers wherein at least one of the one or more further layers is in contact with the metal layer (b), wherein the one or more further layers may contain the desired polyolefin (PO), polyolefin other than the desired polyolefin, or non-polyolefin material;

a2.ii) selecting those pieces present in the polyolefin mixed recycling stream (A2) that are either monolayer film pieces of the desired polyolefin (PO), if present, or pieces of multilayer films (F) as defined in step a2.i), preferably by near-IR spectroscopic analysis, and separating and collecting these pieces to form a recycling stream (B2) enriched in the desired polyolefin (PO);

a2.iii) milling, shredding or grinding the recycling stream (B2) enriched in the desired polyolefin (PO) to convert any pieces that are not in flaked form into flakes with a flake surface area in the range from 50 to 2500 $mm^2$, thereby obtaining a recycling stream (B2) enriched in the desired polyolefin (PO) in flaked form, wherein step a2.iii) can be omitted in the case that the pieces of the recycling stream (B2) enriched in the desired polyolefin (PO) are already in flaked form with a flake surface area in the range from 50 to 2500 $mm^2$.

The process of the second aspect wherein step a2) is achieved through individual steps a2.i) to a2.iii) is identical in nature to the process of the first aspect. All fallback features and preferable ranges for step a1) apply mutatis mutandis to step a2.i), all fallback features and preferable ranges for step b1) apply mutatis mutandis to step a2.ii), and all fallback features and preferable ranges for step c1) apply mutatis mutandis to step a2.iii).

The fragments undergoing the treatment of the later steps of each process are substantively the same in each of the first and second aspects.

The skilled person would be aware that polyolefin mixed recycling streams that have been sorted and polyolefin mixed recycling streams that have not been sorted, or at least not sorted to incorporate only desired polyolefin (PO) containing fragments, are obtainable by methods known in the art, either through an appropriate sorting process, or alternatively via commercially available polyolefin mixed fractions.

Although the processes of the present invention are suitable for the isolation of any desired polyolefin from a polyolefin mixed recycling stream, the isolation of polyethylene or polypropylene is particularly desirable, since these will most likely be the major polyolefin components of any polyolefin mixed recycling stream, and isolated polyethylene or isolated polypropylene can be fed into pure recycled polyolefin streams or extruded and pelletized along to afford pellets (P) of the desired polyolefin, i.e. of polyethylene or polypropylene.

As such, it is preferred that the desired polyolefin (PO) is selected from the group consisting of polyethylene and polypropylene.

In one embodiment, the desired polyolefin (PO) is polyethylene.

In an alternative embodiment, the desired polyolefin (PO) is polypropylene.

In the context of the present invention, polyethylene is taken to mean ethylene homopolymers and copolymers of ethylene containing at least 50 wt.-% ethylene monomers. Polypropylene is taken to mean propylene homopolymers and copolymers of propylene containing at least 50 wt.-% propylene monomers.

The polyolefin mixed recycling stream (A1) of the first aspect may contain both articles for recycling and fragments of articles for recycling, for example flakes. In the context of the present invention, the content of the polyolefin mixed recycling stream (A1) will be referred to as pieces, irrespective of whether these pieces are whole articles, fragments thereof, or flakes thereof.

It is preferred that the pieces that make up the polyolefin mixed recycling stream (A1) have a form wherein the furthest distance from one edge of the piece to another edge of the piece, i.e. the longest single dimension that can be used to characterise the piece, is in the range from 15 to 700 mm, more preferably in the range from 25 to 500 mm, most preferably in the range from 30 to 400 mm.

Pieces having furthest distances/longest single dimensions outside the given ranges are difficult to sort using conventional sorting/separating technologies such as near-IR spectroscopic analysis. If pieces having further distances/longest single dimensions outside the given ranges are present, these can be removed by methods known to the person skilled in the art.

As mentioned above, the pieces that make up the polyolefin mixed recycling stream (A1) may be whole articles, fragments of articles or in flaked form. In embodiments wherein large pieces, either articles or fragments thereof, are present, it is necessary to reduce the size of these pieces to enable an efficient washing/delamination step d1).

Step c1) can be omitted in the case that the pieces of the recycling stream (B1) enriched in the desired polyolefin (PO) are already in flaked form with a flake surface area in the range from 50 to 2500 $mm^2$.

To assess whether the pieces of the recycling stream (B1) enriched in the desired polyolefin (PO) are already in flaked form with a flake surface area in the range from 50 to 2500 $mm^2$ or not, the person skilled in the art may use any one of a number of well-known techniques for measuring size, including sieve analysis and image analysis, most preferably using sieve analysis.

The milling/shredding/grinding of step c1) can be achieved using methods known to the person skilled in the art, including the use of commercially available shredders and grinders. These commercially available machines will typically be configurable to achieve certain target flake surface areas, as would be understood by the person skilled in the art. The precise method used to obtain the flakes having a flake surface area in the range from 50 to 2500 $mm^2$ is not critical for the implementation of the present invention, so long as the desired flake surface area can be attained.

The flakes obtained in step c1) have a flake surface area in the range from 50 to 2500 $mm^2$, more preferably in the range from 100 to 1600 $mm^2$, most preferably in the range from 150 to 900 $mm^2$.

Likewise, the flakes of recycling stream (B2) enriched in the desired polyolefin (PO) in flaked form preferably have a flake surface area in the range from 50 to 2500 $mm^2$, more preferably in the range from 100 to 1600 $mm^2$, most preferably in the range from 150 to 900 $mm^2$.

Both polyolefin mixed recycling stream (A1) and recycling stream (B2) contain multilayer films (F) (or flakes formed from the multilayer films (F)) comprising the following layers:

(a) an outer layer consisting of the desired polyolefin (PO);
(b) a metal layer in contact with the outer layer (a); and
(c) optionally one or more further layers wherein at least one of the one or more further layers is in contact with the metal layer (b), wherein the one or more further layers may contain the desired polyolefin (PO), polyolefin other than the desired polyolefin, or non-polyolefin material.

Key to the structure of the multilayer films (F) described above and below is the presence of a metal layer (b) in contact with the outer layer (a) consisting of the desired polyolefin.

The term "in contact" covers both adhesive contact (i.e. where an adhesive is used to keep the two layers in contact) and direct contact (i.e. where the two layers are directly bonded to one another without the need for an adhesive).

It is preferred that the metal layer (b) is an aluminium layer.

Consequently, it is preferred that the multilayer films (F) comprise the following layers:

(a) an outer layer consisting of the desired polyolefin (PO);
(b) an aluminium layer in contact with the outer layer (a); and
(c) optionally one or more further layers wherein at least one of the one or more further layers is in contact with the metal layer (b), wherein the one or more further layers may contain the desired polyolefin (PO), polyolefin other than the desired polyolefin, or non-polyolefin material.

The metal layer, more preferably the aluminium layer, preferably has a thickness in the range from 1 to 100 nm, more preferably in the range from 5 to 60 nm, most preferably in the range from 10 to 50 nm.

The multilayer films (F) may be obtained by any method known to the person skilled in the art. Particularly preferred methods include lamination and vapour deposition. It is especially preferred that the metal layer, more preferably the aluminium layer, is a vapour deposited metal layer, more preferably a vapour deposited aluminium layer.

In one particularly preferred embodiment, the multilayer films (F) comprise the following layers:

(a) an outer layer consisting of the desired polyolefin (PO);
(b) a metal layer, more preferably an aluminium layer, in contact with the outer layer (a); and
(c) a printed layer in contact with the metal layer (b), more preferably with the aluminium layer (b).

A printed layer may contain multiple components, including inks, primers and varnish. Printed layers in contact with a metal layer would typically consist of a layer of primer in contact with the metal layer, followed by a layer of inks, followed by a layer of varnish, these three layers making up the printed layer. Although this is a typical formulation of a printed layer, the present invention is not restricted to such formulations, and any printed layers, as understood by the person skilled in the art, may be envisaged.

The present invention takes advantage of the finding that certain treatment conditions can affect both a washing of the recycled polyolefin and a demetallization of the recycled polyolefin. When the metal layer is between two polyolefin layers, the demetallization process is in effect a delamination process.

This effect is not restricted to polyolefin-metal-polyolefin multilayer films, but also polyolefin-metal-paper, polyolefin-metal-(non polyolefin) polymer, and polyolefin-metal-ink multilayer films.

Following the key washing/demetallization step, which is described in more detail below, the layers that are not desired polyolefin (PO) layers can be removed in a further sorting step, allowing for the collection of all desired polyolefin (PO) layers.

It would be clear to the person skilled in the art that precursor polyolefin mixed recycling stream (A2) would also contain multilayer films (F) as defined above and below.

In state of the art recycling processes, such multilayer films (F) would either be removed from the recycling stream, ensuring an improved purity but a lower overall yield, or alternatively these may be left in the recycling stream, resulting in a lower purity but an increased yield.

Through the combined washing/delamination procedure of the present invention, the multilayer films (F) can be left in the recycling stream without contributing to a decrease in purity, thus enabling a higher balance of purity and yield than state of the art processes.

Since these multilayer films (F) are selected in step b1), recycling stream (B1) enriched in the desired polyolefin (PO) will also contain the multilayer films (F).

Polyolefin mixed recycling stream (A1), recycling stream (B2), precursor polyolefin mixed recycling stream (A2) and recycling stream (B1) enriched in the desired polyolefin (PO) may also contain monolayer films of the desired polyolefin (PO). Since these films do not contribute to any contamination of the final recycled polyolefin, their presence is not problematic to the present process, and they contribute to the final yield of recycled desired polyolefin (PO).

It is preferred that the polyolefin mixed recycling stream (A1) or the precursor polyolefin mixed recycling stream (A2) originates from post-consumer waste, post-industrial waste, or a combination thereof, preferably from post-consumer waste.

Furthermore, it is preferred that the polyolefin mixed recycling stream (A1) contains at least 40 wt.-%, more preferably at least 70 wt.-%, yet more preferably at least 90 wt.-% of monolayer and/or multilayer polyolefin films.

The precursor polyolefin mixed recycling stream (A2) may also contain at least 40 wt.-%, more preferably at least 70 wt.-%, yet more preferably at least 90 wt.-% of monolayer and/or multilayer polyolefin films.

Step b1) involves the selection of those pieces present in the polyolefin mixed recycling stream (A1) that are either monolayer film pieces of the desired polyolefin (PO), if present, or pieces of multilayer films (F) and separating and collecting these pieces to form a recycling stream (B1) enriched in the desired polyolefin (PO). In other words, this step should result in the removal of any and all pieces that do not contain the desired polyolefin (PO) as an external layer, whilst all pieces having an external layer of the desired polyolefin are retained and form the recycling stream (B1) enriched in the desired polyolefin (PO).

The selection and sorting can be carried out by any method known to the person skilled in the art. Suitable methods include near-IR spectroscopic analysis, mid-IR spectroscopic analysis, high-speed laser spectroscopic analysis, Raman spectroscopic analysis, Fourier-transform infrared (FT-IR) spectroscopic analysis, and sorting by colour. Particularly preferred is near-IR spectroscopic analysis.

The person skilled in the art would understand that most methods of detecting the presence of a desired polyolefin (PO) are only effective if the desired polyolefin (PO) is present at the surface of the piece. Consequently, any multilayer films that contain the desired polyolefin (PO) as an internal layer, but not in any of the external layers, will be removed in step b1).

The washing/delamination step (i.e. steps d1) or b2)) involve treating the recycling streams (B1 or B2) enriched in the desired polyolefin (PO) in flaked form with an aqueous alkaline solution.

The effect of this treatment is a combined washing (i.e. the removal of contaminants from the surface and potentially extraction of small molecules from near the surface), demetallization (i.e. removal of metal from metallized films) and delamination (i.e. the separation of different layers in a multilayer structure).

Under appropriate conditions, all of these three effects can be achieved in one simple treatment step.

The alkaline aqueous solution of the present invention acts to dissolve the metal layer (b), either resulting in a demetallization of the desired polyolefin layer (a) or, if the metal was acting to adhere the desired polyolefin layer (a) to any further layer (c), resulting in a delamination.

It is preferred that the caustic aqueous solution comprises a base in an amount in the range from 0.05 to 10 wt.-%, more preferably in the range from 0.10 to 7 wt.-%, most preferably in the range from 0.50 to 5 wt.-%, relative to the total weight of the alkaline aqueous solution.

The choice of base is not crucial, however it is preferred that the alkaline aqueous solution is an aqueous solution of a base selected from the group consisting of calcium hydroxide, potassium hydroxide, magnesium hydroxide, lithium hydroxide, sodium bicarbonate, sodium hydroxide and mixtures thereof.

It is particularly preferred that the base is sodium hydroxide.

In one particularly preferred embodiment, the alkaline aqueous solution of step d1) or step b2) is a sodium hydroxide solution having a sodium hydroxide concentration in the range from 3 to 10 wt.-%, relative to the total weight of the alkaline aqueous solution.

It is preferred that the pH of the alkaline aqueous solution of step d1) or step b2) is in the range greater than or equal to 9.0, more preferably greater than or equal to 11.0, most preferably greater than or equal to 12.0.

It is alternatively preferred that the pH of the alkaline aqueous solution of step d1) or step b2) is in the range of 9.0 to 14.0, more preferably in the range from 11.0 to 14.0, most preferably in the range from 12.0 to 14.0.

The alkaline aqueous solution of step d1) or step b2) may also comprise a detergent in an amount in the range from 0.1 wt.-% to 1.0 wt.-%, relative to the total weight of the alkaline aqueous solution.

The detergent(s) may be commercially available detergent mixtures or may be composed in any way known to the person skilled in the art. Suitable detergents include TUBIWASH SKP, TUBIWASH GFN, TUBIWASH EYE and TUBIWASH TOP, commercially available from CHT, KRONES colclean AD 1004, KRONES colclean AD 1002 and KRONES colclean AD 1008 from KIC KRONES, and P3-stabilon WT, P3 stabilon AL from ECOLAB Ltd.

The treatment of the recycling stream (B1 or B2) enriched in desired polyolefin (PO) with alkaline aqueous solution in step d1) or step b2) is a washing step, as opposed to a rinsing step as defined herein, and consequently typically lasts 5 minutes or longer, like 5 minutes to 4 hours.

The treatment of the recycling stream (B1 or B2) enriched in desired polyolefin (PO) with alkaline aqueous solution in step d1) or step b2) preferably lasts from 10 minutes to 3 hours, more preferably 15 minutes to 2.5 hours, most preferably from 15 minutes to 1.5 hours.

The treatment of the recycling stream (B1 or B2) enriched in desired polyolefin (PO) in flaked form with alkaline aqueous solution in step d1) or step b2) is preferably carried out at a temperature in the range from 20 to 90° C., preferably in the range from 40 to 85° C., more preferably in the range from 50 to 80° C.

It is further preferred that the combination of alkaline aqueous solution and the recycling stream (B1 or B2) enriched in desired polyolefin (PO) in flaked form in step d1) or step b2) is subjected to agitation through mechanical mixing, ultrasonic treatment, mechanical grinding or pump around loop, preferably the recycling stream (B1 or B2) enriched in desired polyolefin (PO) in flaked form in step d1) or step b2) is subjected to agitation through ultrasonic treatment. This agitation helps to expose the flakes in the recycling stream to fresh alkaline aqueous solution, thus ensuring that the process is not hindered through the buildup of dissolved metal in the immediate vicinity of the flake.

The person skilled in the art would be aware that multiple individual methods as provided above could be combined to improve the agitation, for example a combination of mechanical mixing and ultrasonic treatment.

Following the treatment of the recycling stream (B1 or B2) enriched in desired polyolefin (PO) in flaked form with alkaline aqueous solution in step d1) or step b2), a treated recycling stream (C) dispersed in the alkaline aqueous solution is obtained.

This treated recycling stream (C) dispersed in the alkaline aqueous solution will differ from recycling stream (B1 or B2) enriched in desired polyolefin (PO) in flaked form in that the flakes of multilayer films (F) will have undergone demetallization and/or delamination, whilst all of the flakes will also have been washed.

Step e1) or c2) involves removing the alkaline aqueous solution, thereby obtaining the treated recycling stream (C).

The removed alkaline aqueous solution may be recycled for further use, either for further iterations of step d1) or b2) or alternatively for other recycling processes.

Whilst this removal process is relatively simple to achieve through decanting and/or filtering the mixture, traces of the alkaline aqueous solution can remain on the surface of the recycled polyolefin. These traces of the alkaline aqueous solution may contain solubilized volatile organic compounds, inks and other contaminants, as well as the base, and it is therefore advantageous to remove all trace of the alkaline aqueous solution.

Consequently, step f1) or d2) involves rinsing the treated recycling stream (C) with solvent, thereby removing all residue of the alkaline aqueous solution to obtain a rinsed recycling stream (D).

This rinsed recycling stream may then be dried to remove any solvent residues.

The solvent may be any suitable solvent known to the person skilled in the art. It is, however, preferred that the solvent is water or an aqueous solution.

Drying may be achieved through thermal drying or through a combination of mechanical and thermal drying. Suitable forms of mechanical drying include centrifugal drying and a dewatering press (filter or screw-press), each of which allows for the separation of liquids from solids.

As well as removing any residue of the alkaline aqueous solution, the rinsing step may also serve to remove non-polymeric materials, such as pigments and inks, as well as non-polyolefinic materials having a high density, such as PVC, which can be separated from the rinsed recycling stream (D) due to their differing densities.

Following this rinsing step, a further sorting step (i.e. step g1) or e2)) takes place.

Step g1) or step e2), involve selecting those flakes present in the rinsed recycling stream (D) that contain any material other than the desired polyolefin (PO) and removing these flakes from the treated recycling stream to leave a remaining recycling stream (E) of the desired polyolefin (PO)

This step represents the typical sorting step carried out when sorting polyolefin mixed recycling streams, leaving only the desired polyolefin (PO) present. Such a sorting step may also be termed a purification step. As such, a typical prior art process would involve a combination of steps a1) (i.e. the provision of a polyolefin mixed recycling stream (A1)), a sorting according to step g1) (wherein any flakes containing any material other than the desired polyolefin are removed) and an optional step h1).

The advantage of the procedure according to the processes of the present invention is that desired polyolefin (PO) can also be obtained from multilayer films (F) that would otherwise be sorted out during this typical prior art process, thereby increasing the yield of desired polyolefin (PO) without negatively impacting the purity of the obtained desired polyolefin (PO).

As with step b1), the selection and sorting of step g1) or e2) can be carried out by any method known to the person skilled in the art. Suitable methods include near-IR spectroscopic analysis, mid-IR spectroscopic analysis, high-speed laser spectroscopic analysis, Raman spectroscopic analysis, Fourier-transform infrared (FT-IR) spectroscopic analysis, sorting by colour and sorting by density in solution. Particularly preferred is near-IR spectroscopic analysis.

In one embodiment, the selection and sorting of step g1) or e2) is a density in solution separation, wherein the desired polyolefin (PO) is separated from other materials through differences in the density. In such cases, this density in solution separation step can be carried out simultaneously with the rinsing step f1) or d2) or as a separate step after step f1) or d2), preferably the density in solution separation step and the rinsing step are carried out simultaneously.

In embodiments wherein step g1) or e2) is a density in solution separation step that is carried out after the rinsing step f1) or d2), the rinsing step f1) or d2) preferably does not include an intermediate step of drying the rinsed recycling stream (D) as described above.

Finally, the recycling stream (E) of the desired polyolefin (PO) can be optionally extruded and pelletized to form pellets (P) of the desired polyolefin (PO).

Alternatively, the recycling stream (E) of the desired polyolefin (PO) can be directly extruded to form new recycled articles, or the recycling stream (E) can be sold as flaked recycled polyolefin.

In a third aspect, the present invention is directed to a process for treating a polyolefin mixed recycling stream (B3), comprising, in the given order, the steps of:

a3) providing a polyolefin mixed recycling stream (B3) that comprises at least 50 wt.-%, relative to the total weight of the polyolefin mixed recycling stream (B3), of multilayer films (F) comprising the following layers:
  (a) an outer layer consisting of a polyolefin (PO);
  (b) a metal layer in contact with the outer layer (a); and
  (c) optionally one or more further layers wherein at least one of the one or more further layers is in contact with the metal layer (b), wherein the one or more further layers may contain the polyolefin (PO) of the outer layer (a), polyolefin other than the polyolefin of the outer layer, or non-polyolefin material;

b3) milling, shredding or grinding the polyolefin mixed recycling stream (B3) to convert any pieces that are not in flaked form into flakes with a flake surface area in the range from 50 to 2500 $mm^2$, thereby obtaining a polyolefin mixed recycling stream (B3) in flaked form;

c3) treating the polyolefin mixed recycling stream (B3) in flaked form with an alkaline aqueous solution, thereby obtaining a treated recycling stream (C3) dispersed in the alkaline aqueous solution;

d3) removing the alkaline aqueous solution, thereby obtaining the treated recycling stream (C3), wherein step b3) can be omitted in the case that the pieces of the polyolefin mixed recycling stream (B3) are already in flaked form with a flake surface area in the range from 50 to 2500 $mm^2$.

All preferable embodiments and/or features described for steps c1) and a2.iii) of the previously disclosed first and second aspects of the process of the invention may be applied mutatis mutandis to step b3) of the third aspect.

All preferable embodiments and/or features described for steps d1) and b2) of the previously disclosed first and second aspects of the process of the invention may be applied mutatis mutandis to step c3) of the third aspect.

All preferable embodiments and/or features described for steps e1) and c2) of the previously disclosed first and second aspects of the process of the invention may be applied mutatis mutandis to step d3) of the third aspect.

Furthermore, the process according to the third aspect may comprise further steps after step d3), including one or more of a rinsing step e3), a sorting step f3) and an extruding and pelletizing step g3).

All preferable embodiments and/or features described for steps f1) and d2) of the previously disclosed first and second aspects of the process of the invention may be applied mutatis mutandis to step e3) of the third aspect.

All preferable embodiments and/or features described for steps g1) and e2) of the previously disclosed first and second aspects of the process of the invention may be applied mutatis mutandis to step f3) of the third aspect.

All preferable embodiments and/or features described for steps h1) and f2) of the previously disclosed first and second aspects of the process of the invention may be applied mutatis mutandis to step g3) of the third aspect.

It would be appreciated by the person skilled in the art that the combined washing/delamination procedure of the present invention may have applications outside the field of commercial recycling.

Consequently, the application of the process of the invention to multilayer films (F) that are not present in a polyolefin mixed recycling stream is also envisaged.

Since these multilayer films are not contaminated with other polyolefin pieces, there is no need for an initial sorting step prior to washing/delamination.

As such, a suitable process for achieving the delamination of multilayer films (F) comprises the steps of:

a4) providing flakes of a multilayer film (F) comprising the following layers:
   (a) an outer layer consisting of the desired polyolefin (PO);
   (b) a metal layer in contact with the outer layer (a); and
   (c) one or more further layers wherein at least one of the one or more further layers is in contact with the metal layer (b), wherein the one or more further layers may contain the desired polyolefin (PO), polyolefin other than the desired polyolefin, or non-polyolefin material;

b4) treating the flakes of the multilayer film (F) with an alkaline aqueous solution, thereby obtaining a treated recycling stream (C) dispersed in the alkaline aqueous solution;

c4) removing the alkaline aqueous solution, thereby obtaining the treated recycling stream (C);

d4) rinsing the treated recycling stream (C) with solvent, preferably water or an aqueous solution, thereby removing all residue of the alkaline aqueous solution to obtain a rinsed recycling stream (D)

e4) selecting those flakes present in the rinsed recycling stream (D) that contain any material other than the desired polyolefin (PO), preferably by near-IR spectroscopic analysis or density in solution, and removing these flakes from the treated recycling stream to leave a remaining recycling stream (E) of the desired polyolefin (PO); and f4) optionally extruding and pelletizing the recycling stream (E) of the desired polyolefin (PO) to form pellets (P) of the desired polyolefin (PO).

All preferable embodiments and/or features described for the previously disclosed first and second aspects of the process of the invention may be applied mutatis mutandis to this fourth aspect, which is directed simply to the delamination of multilayer films (F).

Uses

The key finding of the present invention is the combined washing/delamination step d1) (or step b2) or step c3), or step b4)).

As such, in its broadest form, the present invention is further directed to a use of an alkaline aqueous solution for achieving a combined wash/delamination of flaked multilayer films (F) that comprise the following layers:

(a) an outer layer consisting of a desired polyolefin (PO);
(b) a metal layer in contact with the outer layer (a); and
(c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein delamination is achieved when the outer layer (a) that comprises the desired polyolefin (PO) is no longer in contact with the metal layer (b).

In this context, delamination describes both delamination processes (wherein further layer(s) (c) are present) and demetallization processes (wherein no further layers are present).

Any of the preferred embodiments and/or features of the alkaline aqueous solution and/or the combined wash/delamination step (i.e. step d1) or step b2)) as described above apply mutatis mutandis to the use of the alkaline aqueous solution for achieving a combined wash/delamination of flaked multilayer films (F).

Furthermore, the invention is also directed to a use of an alkaline aqueous solution in the process of the present invention.

As such, the present invention is directed to a use of an alkaline aqueous solution for improving the yield of desired polyolefin (PO) of a process for obtaining a recycled stream (E) of desired polyolefin (PO) from a polyolefin mixed recycling stream that comprises multilayer films (F) comprising the following layers:

(a) an outer layer consisting of a desired polyolefin (PO);
(b) a metal layer in contact with the outer layer (a); and
(c) optionally one or more further layers wherein at least one of the one or more further layers is in contact with the metal layer (b), wherein the one or more further layers may contain the desired polyolefin (PO), polyolefin other than the desired polyolefin, or non-polyolefin material, wherein a recycling stream (B) enriched in the desired polyolefin (PO), consisting of multilayer flakes of multilayer films (F) as defined above and optionally monolayer film flakes of the desired polyolefin (PO), is treated with the alkaline aqueous solution in a combined washing/delamination step, and wherein the yield of the desired polyolefin (PO) is improved relative to an analogous process without a step of treating the recycling stream (B) with alkaline aqueous solution in a combined washing/delamination step.

Any of the preferred embodiments and/or features of the processes described above may apply mutatis mutandis to the use of the alkaline aqueous solution for improving the yield of desired polyolefin (PO) in a process for obtaining a recycled stream (E) of desired polyolefin (PO) from a polyolefin mixed recycling stream that comprises multilayer films (F).

EXAMPLES

Example 1: Demetallization of a Film with a Metal Layer on the Surface

A 60 μm 3-layer cast film (having, in the given order, a propylene homopolymer layer, a heterophasic copolymer layer, and a C3/C2/C4 terpolymer layer) with a vapour deposited aluminium layer (layer thickness of 40 nm) was provided. The metallized film was subsequently cut into approximately square flakes having a flake surface area of approximately 500 $mm^2$.

This film was treated with either a 0.1 wt.-% or 3.0 wt.-% NaOH aqueous solution (additionally containing 0.5 wt.-% of TUBIWASH GFN, which is a commercial detergent mix available from CHT Germany GmbH) for 5 minutes at room temperature, whilst being stirred at 250 rpm.

Complete demetallization was observed after 4 minutes for the film treated with the 0.1 wt.-% NaOH aqueous solution, whilst only 1 minute was required to achieve complete demetallization with the 3.0 wt.-% NaOH aqueous solution.

Example 2: Demetallization of Metallized Films with and without Print on the Metallized Surface A 20 μm BOPP film with a vapour deposited aluminium layer (layer thickness of 40 nm). In some instances, the metallized surface of the film was subsequently overprinted, using primer, inks and overprint. The resultant films were subsequently cut into approximately square flakes having a flake surface area of approximately 500 $mm^2$.

These samples, some with print and others without, were treated with either 0.1 wt.-% or 3.0 wt.-% NaOH aqueous solution (additionally containing 0.5 wt.-% of TUBIWASH GFN, which is a commercial detergent mix available from CHT Germany GmbH) at a temperature of either room temperature or 80° C., whilst being stirred at 250 rpm.

Furthermore, the additional effect of ultrasound sonification, as provided using Ultrasound processor UP400S from Hielscher Ultrasonics GmbH (400 W, 24 kHz), was evaluated.

The results of this treatment can be seen in Table 1:

TABLE 1

Results of delamination/demetallization of printed/non-printed samples

| | Temp. | NaOH | Result |
|---|---|---|---|
| Sample without print | RT | 0.1% | Complete demetallization within about 35 min |
| | | 3% | Complete demetallization within <15 min |
| | 80° C. | 0.1% | Complete demetallization within <5 min |
| | | 3% | Complete demetallization within <1 min |
| Sample with print | RT | 0.1% | Demetallization within ~45 min, ink layer can be removed as a film |
| | | 3% | Demetallization within ~20 min, ink layer detaches from the surface as a film (no force required) |
| | 80° C. | 0.1% | Demetallization within <1 min, ink needs to be removed by force |
| | | 3% | Complete demetallization & deinking within <1 min (no ink film visible) |
| | 80° C. (with sonication) | 3% | Complete demetallization & deinking within <1 min (no ink film visible) |

TABLE 2

Results of delamination/demetallization of multilayer films

| Conditions | Washing time (min) | Metallized layer removed (mm) |
|---|---|---|
| Stirring | 20 | 1.5 |
| | 35 | 3 |
| | 45 | 5 |
| | 55 | 10 |
| | 75 | Complete removal |
| Stirring and Sonication | 10 | 2 |
| | 20 | 5 |
| | 40 | 11 |
| | 50 | Complete removal |

Example 3: Delamination of Multilayer Films Having Multiple Polyolefin Layers A 20 μm BOPP film with a vapour deposited aluminium layer (layer thickness of 40 nm) was laminated with a 60 μm 3-layer cast film (c) (having, in the given order, a propylene homopolymer layer, a heterophasic copolymer layer, and a C3/C2/C4 terpolymer layer), to yield a multilayer film having the following layers in the given order:

| | |
|---|---|
| (a) | BOPP film |
| (b) | metal layer |
| (c) | cast film |

These multilayer films were subsequently cut into approximately square flakes having a flake surface area of approximately 500 $mm^2$. These resultant flakes were then treated with a 3 wt.-% NaOH aqueous solution (additionally containing 0.5 wt.-% TUBIWASH GFN, which is a commercial detergent mix available from CHT Germany GmbH) at a temperature of 80° C. Samples of the flakes were removed at different washing times and the extent of demetallization/delamination was determined. Table 2 shows the extent of demetallization/delamination, given in mm from the edge of the flake, both with and without ultrasound sonication, provided using Ultrasound processor UP400S from Hielscher Ultrasonics GmbH (400 W, 24 kHz).

As can be seen from Tables 1 and 2, not only can the method of the present invention be used for the efficient demetallization of metallized films in short treatment times, but also for the complete delamination of multilayer films, including polyolefin/metal/print and polyolefin/metal/polyolefin multilayer films. The ability to conduct this demetallization/delamination step using the same conditions that may be used to wash polyolefin pieces means that demetallization/delamination can be incorporated into mechanical recycling processes without compromising on process efficiency and/or costs, whilst having the potential to boost purity and/or yield of a desired polyolefin in such mechanical recycling processes.

The invention claimed is:

1. A process for treating a polyolefin mixed recycling stream (A1), comprising, in the given order, the steps of:
   a1) providing a polyolefin mixed recycling stream (A1), wherein the polyolefin mixed recycling stream (A1) comprises:
   i) multilayer films (F1) comprising the following layers:
   (a) an outer layer consisting of a desired polyolefin (PO);
   (b) a metal layer in contact with the outer layer (a); and
   (c) one or more further layers wherein at least one of the one or more further layers is in contact with the metal layer (b), wherein the one or more further layers may contain the desired polyolefin (PO), polyolefin other than the desired polyolefin, or non-polyolefin material;
   ii) monolayer films of the desired polyolefin (PO), and
   iii) optionally multilayer films (F2) consisting of the following layers:
   (a) an outer layer consisting of a desired polyolefin (PO); and (b) a metal layer in contact with the outer layer (a), b1) selecting those pieces present in the polyolefin mixed recycling stream (A1) that are either monolayer film pieces of the desired polyolefin (PO) or pieces of multilayer films (F1) or pieces of multilayer films (F2) as defined in step a1) and separating and collecting these pieces to form a recycling stream (B1) enriched in the desired polyolefin (PO);

c1) milling, shredding or grinding the recycling stream (B1) enriched in the desired polyolefin (PO) to convert any pieces that are not in flaked form into flakes with a flake surface area in the range from 50 to 2500 $mm^2$, thereby obtaining a recycling stream (B1) enriched in the desired polyolefin (PO) in flaked form;

d1) treating the recycling stream (B1) enriched in the desired polyolefin (PO) in flaked form with an alkaline aqueous solution, thereby obtaining a treated recycling stream (C) dispersed in the alkaline aqueous solution;

e1) removing the alkaline aqueous solution, thereby obtaining the treated recycling stream (C);

f1) rinsing the treated recycling stream (C) with solvent, thereby removing all residue of the alkaline aqueous solution to obtain a rinsed recycling stream (D);

g1) selecting those flakes present in the rinsed recycling stream (D) that contain any material other than the desired polyolefin (PO) and removing these flakes from the treated recycling stream to leave a remaining recycling stream (E) of the desired polyolefin (PO); and h1) optionally extruding and pelletizing the recycling stream (E) of the desired polyolefin (PO) to form pellets (P) of the desired polyolefin (PO), wherein step c1) can be omitted in the case that the pieces of the recycling stream (B1) enriched in the desired polyolefin (PO) are already in flaked form with a flake surface area in the range from 50 to 2500 $mm^2$, wherein the desired polyolefin (PO) is selected from the group consisting of polypropylene and polyethylene.

2. The process according to claim 1, wherein the alkaline aqueous solution of step d1) has a pH in the range from 9.0 to 14.0.

3. The process according to claim 1, wherein the alkaline aqueous solution of step d1) is an aqueous solution of a base selected from the group consisting of calcium hydroxide, potassium hydroxide, magnesium hydroxide, lithium hydroxide, sodium bicarbonate, sodium hydroxide and mixtures thereof.

4. The process according to claim 3, wherein the amount of the base in the alkaline aqueous solution of step d1) is in the range from 0.05 to 10 wt.-%, relative to the total weight of the alkaline aqueous solution.

5. The process according to claim 1, wherein the alkaline aqueous solution of step d1) comprises a detergent in an amount in the range from 0.1 wt. % to 1.0 wt.-%, relative to the total weight of the alkaline aqueous solution.

6. The process according to claim 1, wherein the combination of alkaline aqueous solution and the recycling stream (B1) enriched in desired polyolefin (PO) in flaked form in step d1) is subjected to agitation through mechanical mixing, ultrasonic treatment, mechanical grinding, pump around loop, or a combination thereof.

7. The process according to claim 1, wherein the treatment of the recycling stream (B1) enriched in desired polyolefin (PO) in flaked form with alkaline aqueous solution in step d1) lasts from 5 minutes to 4 hours.

8. The process according to claim 1, wherein the treatment of the recycling stream (B1) enriched in desired polyolefin (PO) in flaked form with alkaline aqueous solution in step d1) is carried out at a temperature in the range from 20 to 90° C.

9. The process according to claim 1, wherein the polyolefin mixed recycling stream (A1) originates from post-consumer waste, post-industrial waste, or a combination thereof.

10. The process according to claim 1, wherein the polyolefin mixed recycling stream (A1) contains at least 40 wt.-% of monolayer and/or multilayer polyolefin films.

11. A process for treating a recycling stream (B2) enriched in a desired polyolefin (PO), comprising, in the given order, the steps of:

a2) providing a recycling stream (B2) enriched in the desired polyolefin (PO), wherein the recycling stream (B2) comprises:

i) multilayer films (F1) comprising the following layers:

(a) an outer layer consisting of the desired polyolefin (PO);

(b) a metal layer in contact with the outer layer (a); and (c) one or more further layers wherein at least one of the one or more further layers is in contact with the metal layer (b), wherein the one or more further layers may contain the desired polyolefin (PO), polyolefin other than the desired polyolefin, or non-polyolefin material, ii) monolayer films of the desired polyolefin (PO), and iii) optionally multilayer films (F2) consisting of the following layers:

(a) an outer layer consisting of a desired polyolefin (PO); and (b) a metal layer in contact with the outer layer (a), wherein the recycling stream (B2) enriched in the desired polyolefin (PO) is provided in flaked form, and wherein the recycling stream (B2) enriched in the desired polyolefin (PO) is obtainable by a process comprising the steps, in the given order, of selecting those pieces present in a precursor polyolefin mixed recycling stream (A2) that are either monolayer film pieces of the desired polyolefin (PO) or pieces of multilayer films (F1) or multilayer films (F2) as defined above and separating and collecting these pieces to form the recycling stream (B2) enriched in the desired polyolefin (PO);

b2) treating the recycling stream (B2) enriched in the desired polyolefin (PO) in flaked form with an alkaline aqueous solution, thereby obtaining a treated recycling stream (C) dispersed in the alkaline aqueous solution;

c2) removing the alkaline aqueous solution, thereby obtaining the treated recycling stream (C);

d2) rinsing the treated recycling stream (C) with solvent thereby removing all residue of the alkaline aqueous solution to obtain a rinsed recycling stream (D);

e2) selecting those flakes present in the rinsed recycling stream (D) that contain any material other than the desired polyolefin (PO) and removing these flakes from the treated recycling stream to leave a remaining recycling stream (E) of the desired polyolefin (PO); and f2) optionally extruding and pelletizing the recycling stream (E) of the desired polyolefin (PO) to form pellets (P) of the desired polyolefin (PO), wherein the desired polyolefin (PO) is selected from the group consisting of polypropylene and polyethylene.

12. The process according to claim 11, wherein step a2) of providing a recycling stream (B2) enriched in the desired polyolefin (PO) is achieved through the following steps, in the given order:

a2.i) providing a polyolefin mixed recycling stream (A2), wherein the polyolefin mixed recycling stream (A2) comprises:

i) multilayer films (F1) comprising the following layers:

(a) an outer layer consisting of the desired polyolefin (PO);

(b) a metal layer in contact with the outer layer (a); and (c) one or more further layers wherein at least one of the one or more further layers is in contact with the metal layer (b), wherein the one or more further layers may contain the desired polyolefin (PO), polyolefin other than the desired polyolefin, or non-polyolefin material;

ii) monolayer films of the desired polyolefin (PO), and (iii) optionally multilayer films (F2) consisting of the following layers:

(a) an outer layer consisting of a desired polyolefin (PO); and (b) a metal layer in contact with the outer layer (a), a2.ii) selecting those pieces present in the polyolefin mixed recycling stream (A2) that are either monolayer film pieces of the desired polyolefin (PO) or pieces of multilayer films (F1) or pieces of multilayer films (F2) as defined in step a2.i) and separating and collecting these pieces to form a recycling stream (B2) enriched in the desired polyolefin (PO);

a2.iii) milling, shredding or grinding the recycling stream (B2) enriched in the desired polyolefin (PO) to convert any pieces that are not in flaked form into flakes with a flake surface area in the range from 50 to 2500 $mm^2$, thereby obtaining a recycling stream (B2) enriched in the desired polyolefin (PO) in flaked form, wherein step a2.iii) can be omitted in the case that the pieces of the recycling stream (B2) enriched in the desired polyolefin (PO) are already in flaked form with a flake surface area in the range from 50 to 2500 $mm^2$.

13. A process for treating a polyolefin mixed recycling stream (B3), comprising, in the given order, the steps of:

a3) providing a polyolefin mixed recycling stream (B3) that comprises at least 50 wt.-%, relative to the total weight of the polyolefin mixed recycling stream (B3), of multilayer films (F1) and optionally multilayer films (F2), wherein the multilayer films (F1) comprise the following layers:

(a) an outer layer consisting of a polyolefin (PO);

(b) a metal layer in contact with the outer layer (a); and (c) one or more further layers wherein at least one of the one or more further layers is in contact with the metal layer (b), wherein the one or more further layers may contain the polyolefin (PO) of the outer layer (a), polyolefin other than the polyolefin of the outer layer, or non-polyolefin material;

wherein the multilayer films (F2) consist of the following layers:

(a) an outer layer consisting of a polyolefin (PO);

(b) a metal layer in contact with the outer layer (a), and wherein the polyolefin mixed recycling stream (B3) also comprises monolayer films of the desired polyolefin (PO), b3) milling, shredding or grinding the polyolefin mixed recycling stream (B3) to convert any pieces that are not in flaked form into flakes with a flake surface area in the range from 50 to 2500 $mm^2$, thereby obtaining a polyolefin mixed recycling stream (B3) in flaked form;

c3) treating the polyolefin mixed recycling stream (B3) in flaked form with an alkaline aqueous solution, thereby obtaining a treated recycling stream (C3) dispersed in the alkaline aqueous solution;

d3) removing the alkaline aqueous solution, thereby obtaining the treated recycling stream (C3), e3) rinsing the treated recycling stream (C3) with solvent thereby removing all residue of the alkaline aqueous solution to obtain a rinsed recycling stream (D3); and f3) selecting those flakes present in the rinsed recycling stream (D3) that contain any material other than the desired polyolefin (PO) and removing these flakes from the treated recycling stream to leave a remaining recycling stream (E3) of the desired polyolefin (PO);

g3) optionally extruding and pelletizing the recycling stream (E3) of the desired polyolefin (PO) to form pellets (P) of the desired polyolefin (PO), wherein step b3) can be omitted in the case that the pieces of the polyolefin mixed recycling stream (B3) are already in flaked form with a flake surface area in the range from 50 to 2500 $mm^2$, wherein the desired polyolefin (PO) is selected from the group consisting of polypropylene and polyethylene.

14. The process according to claim 13, wherein the alkaline aqueous solution of step c3) is an aqueous solution of a base selected from the group consisting of calcium hydroxide, potassium hydroxide, magnesium hydroxide, lithium hydroxide, sodium bicarbonate, sodium hydroxide and mixtures thereof.

15. The process according to claim 14, wherein the amount of the base in the alkaline aqueous solution of step c3) is in the range from 0.05 to 10 wt.-%, relative to the total weight of the alkaline aqueous solution.

16. The process according to claim 13, wherein the alkaline aqueous solution of step c3) comprises a detergent in an amount in the range from 0.1 wt. % to 1.0 wt.-%, relative to the total weight of the alkaline aqueous solution.

17. The process according to claim 13, wherein the combination of alkaline aqueous solution and the polyolefin mixed recycling stream (B3) in flaked form in step c3) is subjected to agitation through mechanical mixing, ultrasonic treatment, mechanical grinding, pump around loop, or a combination thereof.

18. The process according to claim 13, wherein the treatment of the polyolefin mixed recycling stream (B3) in flaked form with alkaline aqueous solution in step c3) is carried out at a temperature in the range from 20 to 90° C.

* * * * *